(12) United States Patent
Uraguchi et al.

(10) Patent No.: US 9,656,729 B2
(45) Date of Patent: May 23, 2017

(54) DOUBLE-SHELL SHIP TANK STRUCTURE AND LIQUEFIED GAS CARRIER

(71) Applicant: KAWASAKI JUKOGYO KABUSHIKI KAISHA, Kobe-shi, Hyogo (JP)

(72) Inventors: Ryosuke Uraguchi, Akashi (JP); Takumi Yoshida, Kobe (JP); Asako Murakami, Kobe (JP); Naruyoshi Izumi, Kobe (JP); Kentaro Okumura, Kakogawa (JP); Osamu Muragishi, Kakogawa (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 0 days.

(21) Appl. No.: 14/786,731

(22) PCT Filed: Apr. 21, 2014

(86) PCT No.: PCT/JP2014/002222
§ 371 (c)(1),
(2) Date: Oct. 23, 2015

(87) PCT Pub. No.: WO2014/174820
PCT Pub. Date: Oct. 30, 2014

(65) Prior Publication Data
US 2016/0075412 A1    Mar. 17, 2016

(30) Foreign Application Priority Data

Apr. 23, 2013 (JP) ................................ 2013-090098

(51) Int. Cl.
*B63B 25/16* (2006.01)
*B63B 35/00* (2006.01)
(Continued)

(52) U.S. Cl.
CPC .............. *B63B 35/003* (2013.01); *B63B 3/16* (2013.01); *B63B 25/16* (2013.01); *F17C 3/025* (2013.01);
(Continued)

(58) Field of Classification Search
CPC ......... B63B 25/08; B63B 25/12; B63B 25/14; B63B 25/16; F17C 3/02; F17C 3/04
(Continued)

(56) References Cited

U.S. PATENT DOCUMENTS 2,706,575 A * 4/1955 Soherr .................. F17C 13/081
220/560.05
3,677,021 A   7/1972 Bognaes et al.
(Continued)

FOREIGN PATENT DOCUMENTS

CN    201177156 Y    1/2009
CN    103032673 A    4/2013
(Continued)

OTHER PUBLICATIONS

Jun. 24, 2014 International Search Report issued in International Patent Applicaton No. PCT/JP2015/002222.
(Continued)

*Primary Examiner* — Lars A Olson
(74) *Attorney, Agent, or Firm* — Oliff PLC

(57) ABSTRACT

A structure of a horizontal type cylindrical double-shell tank mounted on a ship includes: an inner shell storing liquefied gas; and an outer shell forming a vacuum space between the inner shell and the outer shell. A pair of support units supporting the inner shell is disposed between the inner shell and the outer shell. Each support unit includes: a plurality of cylindrical elements arranged in a circumferential direction of the tank such that an axial direction of each of the cylindrical elements coincides with a radial direction of the (Continued)

tank; a plurality of inner members each holding an end portion of a corresponding one of the cylindrical elements at the inner shell side; and a plurality of outer members each holding an end portion of a corresponding one of the cylindrical elements at the outer shell side. Each of the cylindrical elements is made of glass fiber reinforced plastic.

16 Claims, 7 Drawing Sheets

(51) Int. Cl.
*F17C 3/02* (2006.01)
*F17C 13/08* (2006.01)
*B63B 3/16* (2006.01)

(52) U.S. Cl.
CPC .... *F17C 13/082* (2013.01); *F17C 2201/0104* (2013.01); *F17C 2201/0109* (2013.01); *F17C 2201/035* (2013.01); *F17C 2201/052* (2013.01); *F17C 2201/054* (2013.01); *F17C 2203/013* (2013.01); *F17C 2203/014* (2013.01); *F17C 2203/0304* (2013.01); *F17C 2203/0391* (2013.01); *F17C 2203/0629* (2013.01); *F17C 2203/0636* (2013.01); *F17C 2205/0103* (2013.01); *F17C 2205/018* (2013.01); *F17C 2221/012* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2260/011* (2013.01); *F17C 2260/031* (2013.01); *F17C 2270/0105* (2013.01); *Y02E 60/321* (2013.01)

(58) Field of Classification Search
USPC ............ 114/74 A, 74 R; 220/560.04, 560.11, 220/560.12
See application file for complete search history.

(56) References Cited

U.S. PATENT DOCUMENTS

| | | | |
|---|---|---|---|
| 3,841,269 A | 10/1974 | Urruela | |
| RE29,424 E | 10/1977 | Bognaes et al. | |
| 4,345,861 A * | 8/1982 | Aarseth | B63B 25/16 114/74 A |
| 8,245,658 B2 * | 8/2012 | Holland | B63B 25/16 114/74 R |
| 2009/0145909 A1 | 6/2009 | Hausberger | |
| 2011/0192339 A1 | 8/2011 | Chen et al. | |

FOREIGN PATENT DOCUMENTS

| | | |
|---|---|---|
| DE | 102006018639 A1 | 10/2007 |
| DE | 202013101162 U1 | 3/2013 |
| JP | S60-245899 A | 12/1985 |
| JP | H06-159593 A | 6/1994 |
| JP | 2003-240198 A | 8/2003 |
| JP | 3708055 B2 | 10/2005 |
| JP | 2008-164066 A | 7/2008 |
| JP | 2013-053674 A | 3/2013 |
| JP | 2014-074452 A | 4/2014 |
| KR | 1983-0001088 A | 4/1983 |
| KR | 1983-0001295 B1 | 7/1983 |
| KR | 2012-0105308 A | 9/2012 |
| KR | 2013-0001844 A | 1/2013 |

OTHER PUBLICATIONS

Jun. 24, 2014 Writtten Opinion issued in International Patent Application No. PCT/JP2014/002222.
Apr. 25, 2016 Office Action issued in Chinese Patent Application No. 201480021749.2.
Nov. 22, 2016 Search Report issued in European Patent Application No. 14787872.2.
Nov. 22, 2016 Search Report issued in European Patent Application No. 14787957.1.
U.S. Appl. No. 14/786,588, filed Oct. 23, 2015 in the name of Uraguchi et al.
Jul. 27, 2016 Office Action issued in Chinese Patent Application No. 201480021758.1.
Jul. 22, 2014 International Search Report issued in International Patent Application No. PCT/JP2014/002221.
Aug. 17, 2016 Office Action Issued in U.S. Appl. No. 14/786,588.

* cited by examiner

DOUBLE-SHELL SHIP TANK STRUCTURE AND LIQUEFIED GAS CARRIER

TECHNICAL FIELD

The present invention relates to a structure of a double-shell tank mounted on a ship and to a liquefied gas carrier including a double-shell tank with the tank structure.

BACKGROUND ART

Tanks in various shapes are used in liquefied gas carriers for marine transportation of a liquefied gas. Among these tanks, there is a case where a horizontal type cylindrical tank is supported by a pair of saddles spaced apart from each other in the axial direction of the tank. Each saddle has an arc-shaped supporting surface extending along the outer peripheral surface of the tank so that even when the ship oscillates (in a case where the axial direction of the tank coincides with the ship length direction, even when the ship rolls), the saddles can receive the load of the tank.

As a horizontal type cylindrical tank, a double-shell tank is known, in which a space between an inner shell storing a liquefied gas and an outer shell encapsulating the inner shell is kept as a vacuum space. For example, Patent Literature 1 discloses a double-shell tank whose outer shell is supported by a pair of saddles, and two support units are disposed between the outer shell and the inner shell over each saddle. That is, four support units are disposed in total.

Over each saddle, the two support units are disposed symmetrically with respect to a vertical line passing through the center of the tank, and each support unit has a structure in which plate-shaped members are stacked in the radial direction of the tank. Specifically, each support unit includes: an outer-shell-side support member disposed on the inner peripheral surface of the outer shell; an inner-shell-side support member disposed on the outer peripheral surface of the inner shell; and a thermal insulating material interposed between these support members.

CITATION LIST

Patent Literature

PTL 1: Japanese Laid-Open Patent Application Publication No. H06-159593
PTL 2: Japanese Laid-Open Patent Application Publication No. S60-245899

SUMMARY OF INVENTION

Technical Problem

In the case of a support unit in which plate-shaped members are stacked as in Patent Literature 1, there is a risk that a large amount of heat enters the inner shell from the outside via the support unit. In order to suppress evaporation of the liquefied gas during the transportation, it is desirable that heat transfer by the support unit be reduced. For example, it is conceivable to form a hollow support unit with a small cross-sectional area in order to reduce a heat transfer area. However, in the case of such a hollow support unit, the issue is what structure should be adopted so that the support unit can bear the load of the inner shell including the contents therein when the ship oscillates.

Patent Literature 2 discloses, as conventional art, a vertical type cylindrical triple-shell tank, in which an intermediate shield plate is provided between inner and outer shells. At the center of the bottom of the tank, a supporting device is disposed between the outer shell and the inner shell. The supporting device includes: an outer cylindrical element made of GFRP, which couples the outer shell and the intermediate shield plate; an inner cylindrical element made of CFRP, which couples the intermediate shield plate and the inner shell and which has a less diameter than that of the outer cylindrical element; and a cup-shaped holder integrally formed on the intermediate shield plate and serving to hold the inner cylindrical element inside the outer cylindrical element. However, this supporting device is a device for supporting the weight of the inner shell of the vertical type cylindrical tank at one point, which is the peak of a lower hemispherical part of the inner shell where the weight of the inner shell is concentrated. Therefore, the technical idea of this supporting device cannot be applied to a horizontal type cylindrical tank supported by a pair of saddles. Although Japanese Laid-Open Patent Application Publication No. S60-245899 discloses horizontally disposing a similar supporting device on the body portion of the tank, since the weight of the inner shell is not applied to the horizontally-disposed supporting device, it is presumed that the role of the horizontally-disposed supporting device is to keep the inner shell in a state of standing upright (i.e., to merely prevent the inner shell from falling down).

In view of the above, an object of the present invention is to provide a double-shell ship tank structure including hollow support units capable of bearing the load of the inner shell including the contents therein when a ship oscillates, and to provide a liquefied gas carrier including a double-shell tank with the tank structure.

Solution to Problem

In order to solve the above-described problems, a double-shell ship tank structure according to the present invention is a structure of a horizontal type cylindrical double-shell tank mounted on a ship and includes: an inner shell storing a liquefied gas; an outer shell forming a vacuum space between the inner shell and the outer shell; and a pair of support units disposed between the inner shell and the outer shell and supporting the inner shell at positions spaced apart from each other in an axial direction of the tank. Each of the pair of support units includes: a plurality of cylindrical elements arranged in a circumferential direction of the tank such that an axial direction of each of the cylindrical elements coincides with a radial direction of the tank; a plurality of inner members each holding, on an outer peripheral surface of the inner shell, an end portion of a corresponding one of the cylindrical elements at the inner shell side; and a plurality of outer members each holding, on an inner peripheral surface of the outer shell, an end portion of a corresponding one of the cylindrical elements at the outer shell side. Each of the cylindrical elements is made of glass fiber reinforced plastic.

The "circumferential direction of the tank" herein means a direction around the center of the tank on a plane perpendicular to the axial direction of the tank. The "radial direction of the tank" herein means a direction extending radially from the center of the tank on the plane perpendicular to the axial direction of the tank.

According to the above configuration, the cylindrical elements arranged in the circumferential direction of the tank and the inner and outer members sandwiching the cylindrical elements form a hollow load-transmitting structure extending in the circumferential direction of the tank.

Since the axial direction of each cylindrical element coincides with the radial direction of the tank, even when the ship oscillates, the support units can disperse the load of the inner shell including the contents therein as mainly compressive force in the axial direction of each cylindrical element, thereby bearing the load of the inner shell. In addition, since glass fiber reinforced plastic (GFRP) whose thermal conductivity is low is used as the material forming each cylindrical element, the entry of heat via the support units can be further suppressed.

A metal plating layer may be formed on each of an inner peripheral surface and an outer peripheral surface of each of the cylindrical elements. According to this configuration, release of outgas from the cylindrical elements made of GFRP can be prevented.

Each of the inner members may include an inner fitting portion fitted to the end portion of the corresponding cylindrical element at the inner shell side. According to this configuration, the end portion of the cylindrical element at the inner shell side can be held with a simple shape.

The inner fitting portion may have an annular shape such that the end portion of the cylindrical element at the inner shell side is fitted inside the inner fitting portion. According to this configuration, formation of a gap between the inner fitting portion and the cylindrical element can be prevented when thermal contraction of the inner member together with the inner shell occurs.

For example, each of the inner members may include an inner surface plate covering an opening of the corresponding cylindrical element at the inner shell side, and the inner fitting portion may protrude from the inner surface plate.

A first main surface of the inner surface plate at the inner shell side may be a curved surface whose curvature center is the same as that of the outer peripheral surface of the inner shell, and a second main surface of the inner surface plate at the cylindrical element side may be a flat surface perpendicular to the radial direction of the tank. According to this configuration, the shape of the inner member can be made simpler than in a case where the second main surface is a curved surface whose curvature center is the same as that of the outer peripheral surface of the inner shell.

Each of the inner members may be an annular member with a groove formed therein, and the end portion of the corresponding cylindrical element at the inner shell side may be fitted in the groove. According to this configuration, each inner member can be formed, for example, as a single component, and thereby the number of components can be reduced.

Each of the outer members may include an outer fitting portion fitted to the end portion of the corresponding cylindrical element at the outer shell side. According to this configuration, the end portion of the cylindrical element at the outer shell side can be held with a simple shape.

For example, each of the outer members may include an outer surface plate covering an opening of the corresponding cylindrical element at the outer shell side, and the outer fitting portion may protrude from the outer surface plate.

A first main surface of the outer surface plate at the outer shell side may be a curved surface whose curvature center is the same as that of the inner peripheral surface of the outer shell, and a second main surface of the inner surface plate at the cylindrical element side may be a flat surface perpendicular to the radial direction of the tank. According to this configuration, the shape of the outer member can be made simpler than in a case where the second main surface is a curved surface whose curvature center is the same as that of the inner peripheral surface of the outer shell.

Each of the outer members may be an annular member with a groove formed therein, and the end portion of the corresponding cylindrical element at the outer shell side may be fitted in the groove. According to this configuration, each outer member can be formed, for example, as a single component, and thereby the number of components can be reduced.

The inner members may be fixed to the inner shell. The outer members of one of the pair of support units may be configured such that displacement of the outer members in the axial direction of the tank relative to the outer shell is restricted. The outer members of the other one of the pair of support units may be configured to be slidable on the inner peripheral surface of the outer shell in the axial direction of the tank. This configuration makes it possible to accommodate a reduction in the length of the inner shell due to thermal contraction.

A gap may be formed between each pair of adjoining outer members among the outer members of each of the pair of support units, the gap allowing each outer member to move in the circumferential direction of the tank. This configuration makes it possible to allow the outer members to move together with the cylindrical elements when a reduction in the diameter of the inner shell occurs due to thermal contraction.

A lubricating liner may be sandwiched between the inner peripheral surface of the outer shell and the outer members of the other one of the pair of support units. According to this configuration, friction between the inner peripheral surface of the outer shell and the outer members can be reduced with a simple configuration. This makes it possible to prevent excessive shear force from being exerted on the cylindrical elements.

The present invention also provides a liquefied gas carrier including: a horizontal type cylindrical double-shell tank with the above-described double-shell ship tank structure; and a pair of saddles supporting the tank at positions corresponding to the pair of support units.

Advantageous Effects of Invention

The present invention makes it possible to provide a double-shell ship tank structure including hollow support units capable of bearing the load of the inner shell including the contents therein when a ship oscillates.

DESCRIPTION OF EMBODIMENTS

Figure 1:
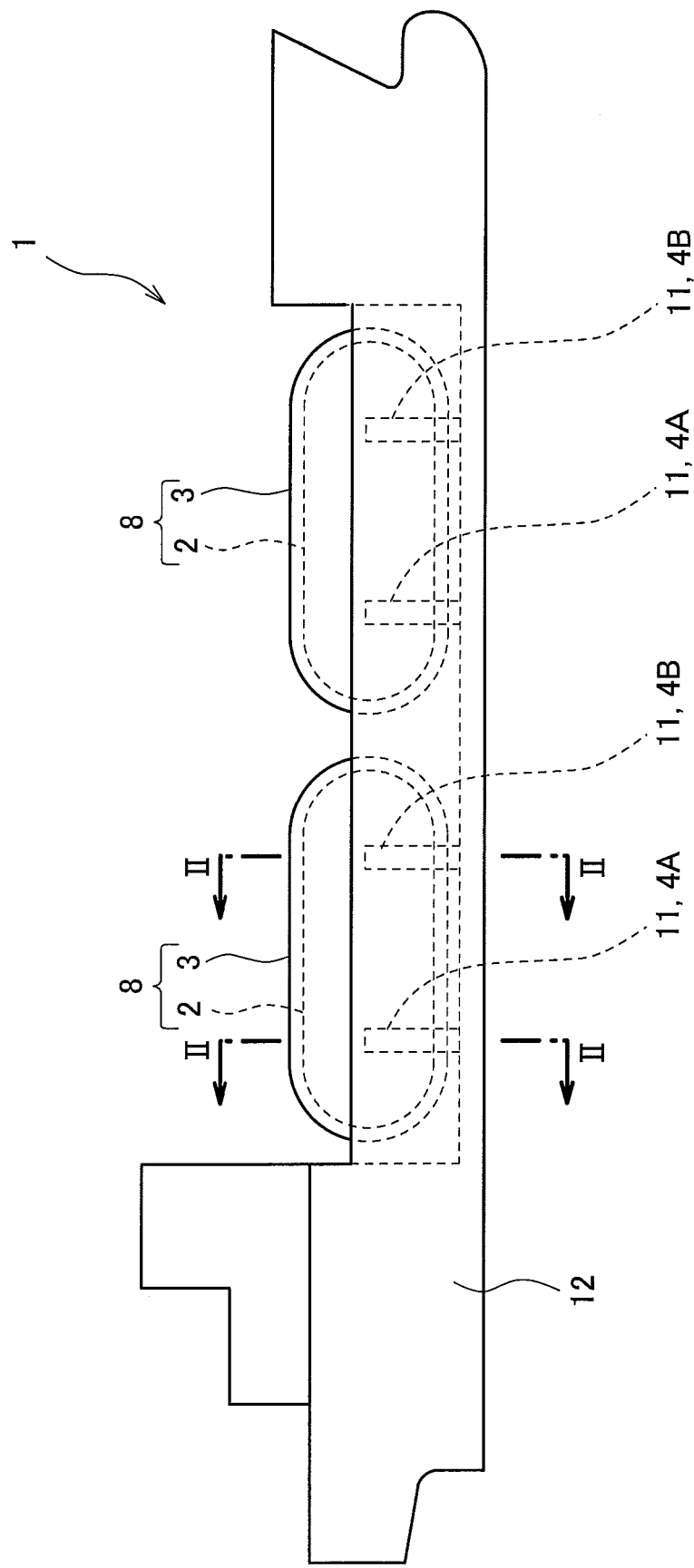
FIG. 1 is a side view of a liquefied gas carrier, on which double-shell tanks each with a double-shell ship tank structure according to one embodiment of the present invention are mounted.
Figure 2:
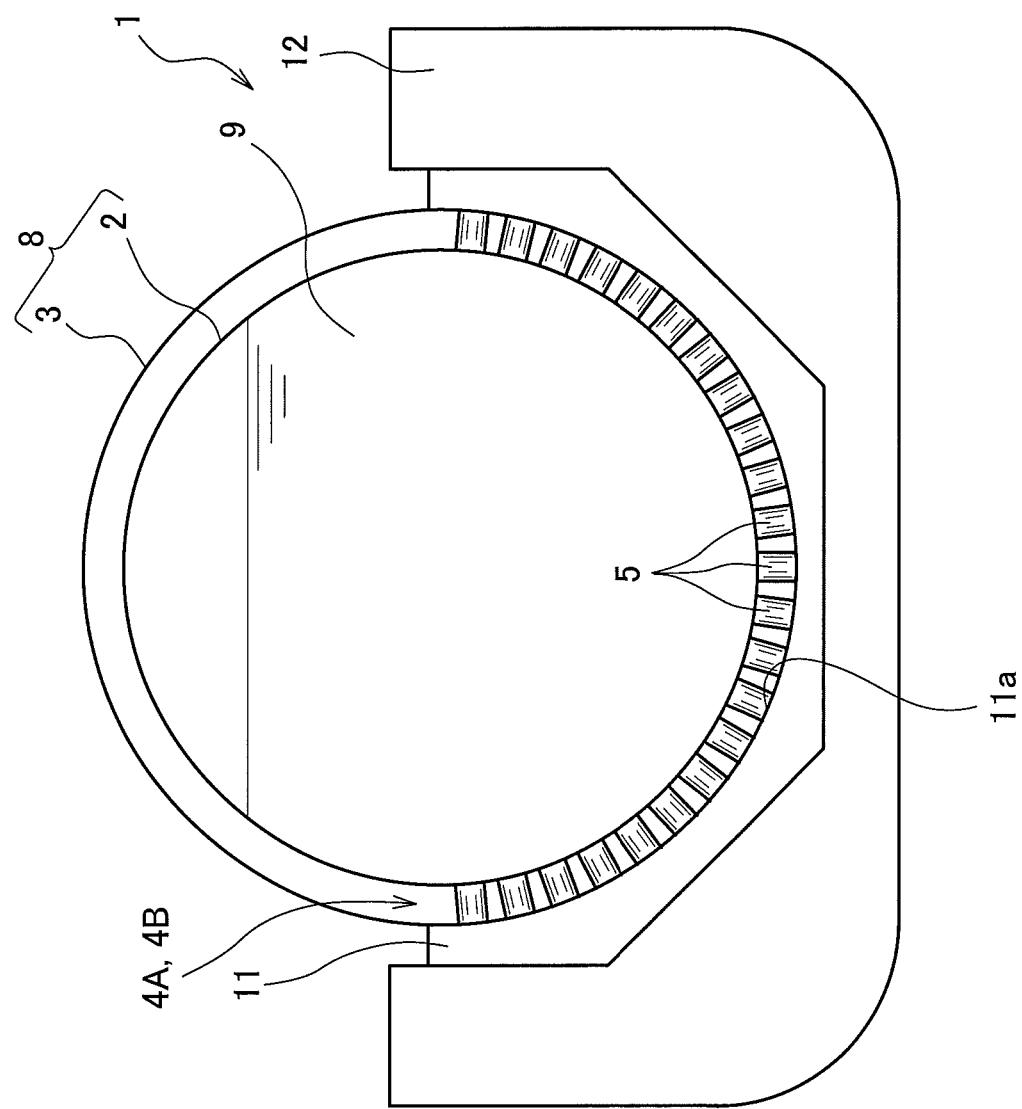
FIG. 2 is a sectional view taken along line II-II of FIG. 1.

FIG. 1 and FIG. 2 show a liquefied gas carrier 1, on which double-shell tanks 8 each with a double-shell ship tank structure according to one embodiment of the present invention are mounted. In the present embodiment, two horizontal type cylindrical double-shell tanks 8, which are mounted on the liquefied gas carrier 1, are arranged side by side in the ship length direction.

Each double-shell tank 8 includes an inner shell 2 storing a liquefied gas 9 and an outer shell 3 encapsulating the inner shell 2. For example, the liquefied gas 9 is liquefied petroleum gas (LPG, about −45° C.), liquefied ethylene gas (LEG, about −100° C.), liquefied natural gas (LNG, about −160° C.), or liquefied hydrogen ($LH_2$, about −250° C.).

The inner shell 2 includes: a body portion extending in a transverse direction (ship length direction) with a constant cross-sectional shape; and hemispherical sealing portions sealing openings on both sides of the body portion. It should be noted that, alternatively, each sealing portion may have a flat shape parallel to the vertical direction, or may be dish-shaped. The outer shell 3 has such a shape that a space with a constant thickness is formed around the inner shell 2. The space between the outer shell 3 and the inner shell 2 is a vacuum space.

In a hull 12 of the liquefied gas carrier 1, a pair of saddles 11 spaced apart from each other in the axial direction of the tank 8 is provided for each tank 8. The pair of saddles 11 supports the tank 8 in the vicinity of both ends of the body portion of the inner shell 2.

Each saddle 11 includes a supporting surface 11a, which makes surface contact with the outer peripheral surface of the outer shell 3. In the present embodiment, when seen in the axial direction of the tank 8, the supporting surface 11a extends from right below the bottom of the outer shell 3 to both sides such that the supporting surface 11a extends by substantially 90 degrees to each side. In other words, the supporting surface 11a forms a semicircular recess, in which substantially the half of the outer shell 3 is fitted.

A pair of support units 4A and 4B spaced apart from each other in the axial direction of the tank 8 is disposed between the outer shell 3 and the inner shell 2. The positions where the pair of support units 4A and 4B is disposed coincide with the positions where the pair of saddles 11 is disposed. Each support unit (4A or 4B) supports the inner shell 2 on the inner peripheral surface of the outer shell 3.

In the present embodiment, the support unit 4A positioned on the aft side is a fixed-side first support unit, and the support unit 4B positioned on the fore side is a sliding-side second support unit. However, as an alternative, the fixed-side first support unit 4A may be disposed on the fore side, and the sliding-side second support unit 4B may be disposed on the aft side.

Figure 3:
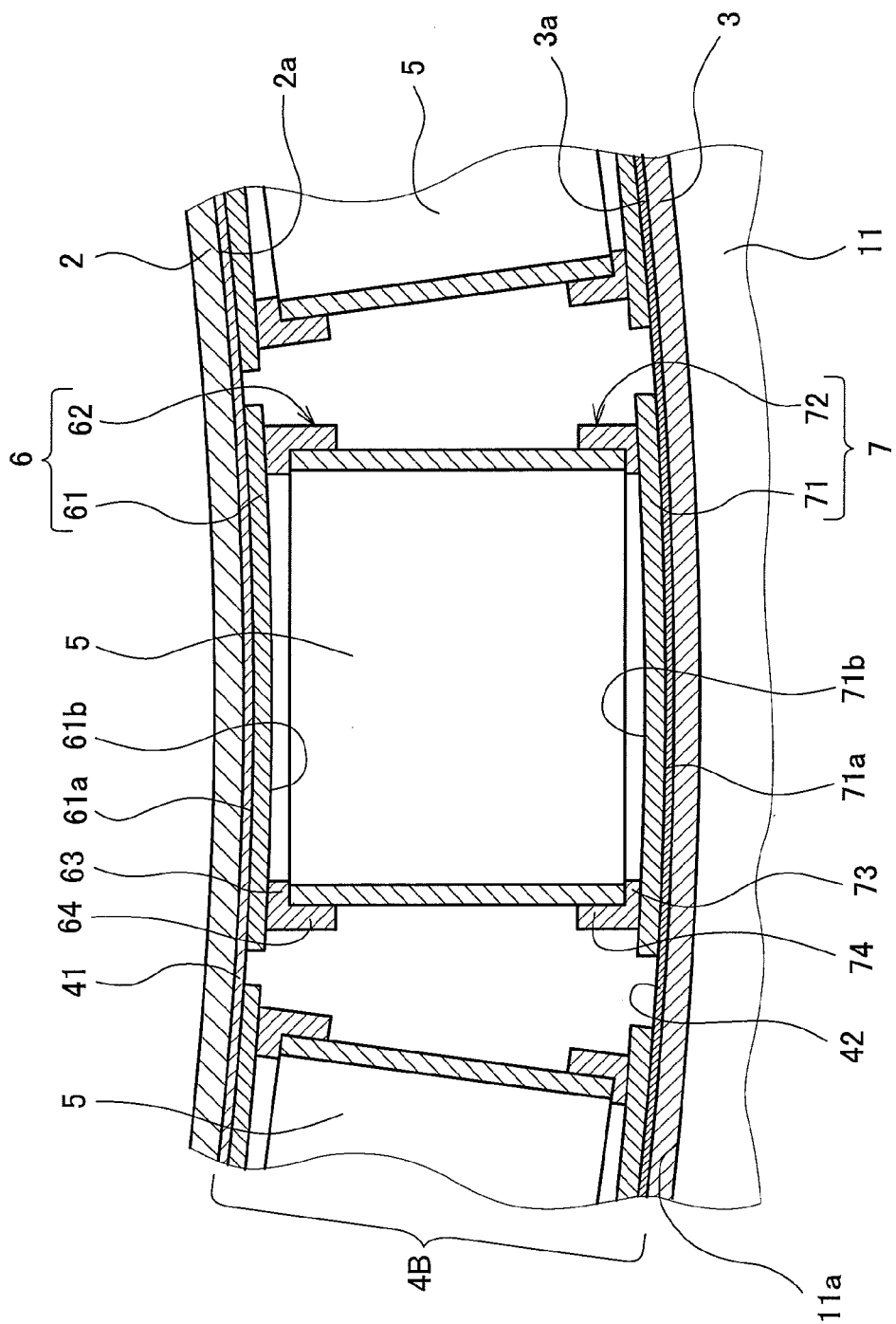
FIG. 3 is a front sectional view showing an essential part of a sliding-side second support unit.
Figure 4:
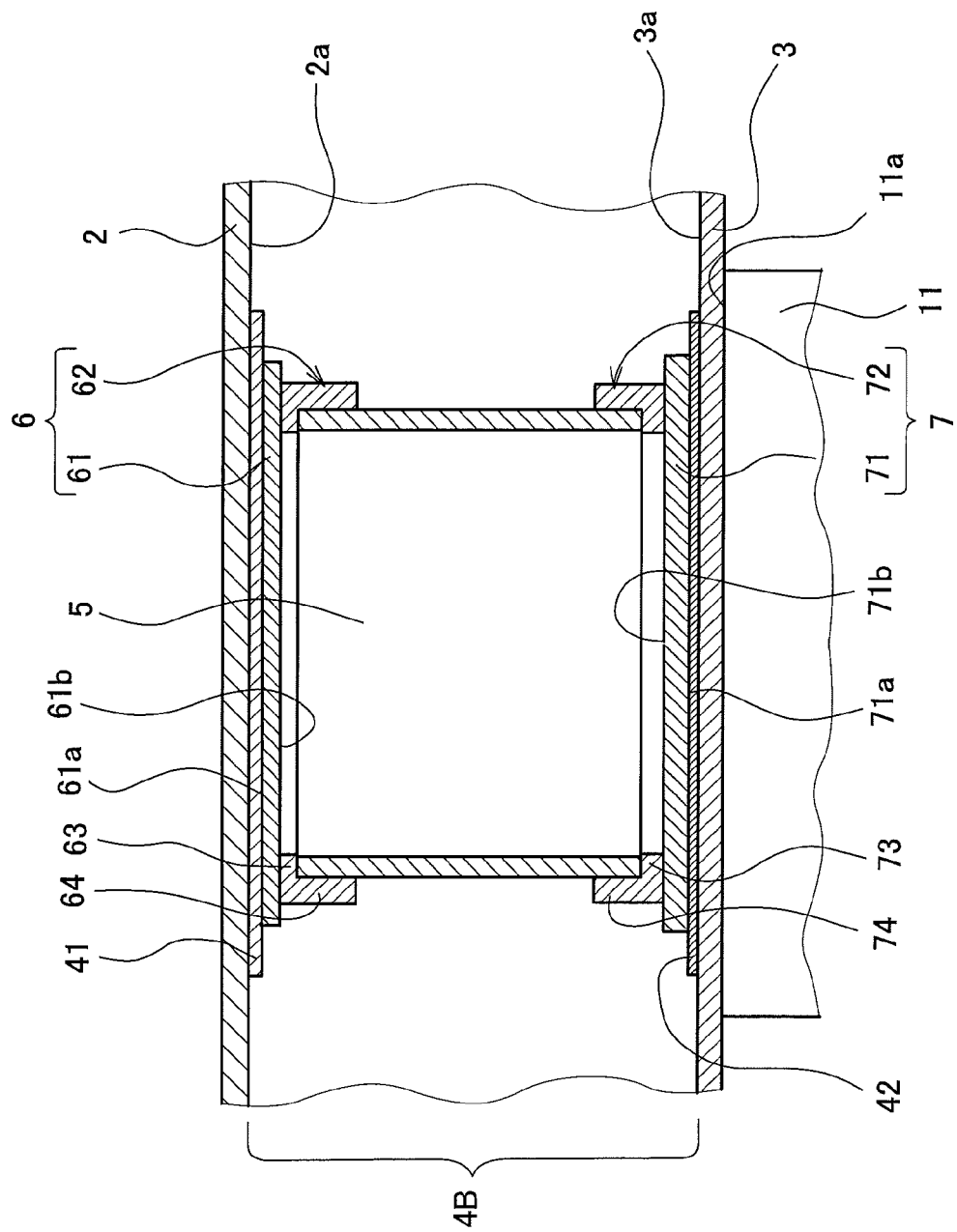
FIG. 4 is a side sectional view showing an essential part of the sliding-side second support unit.
Figure 5:
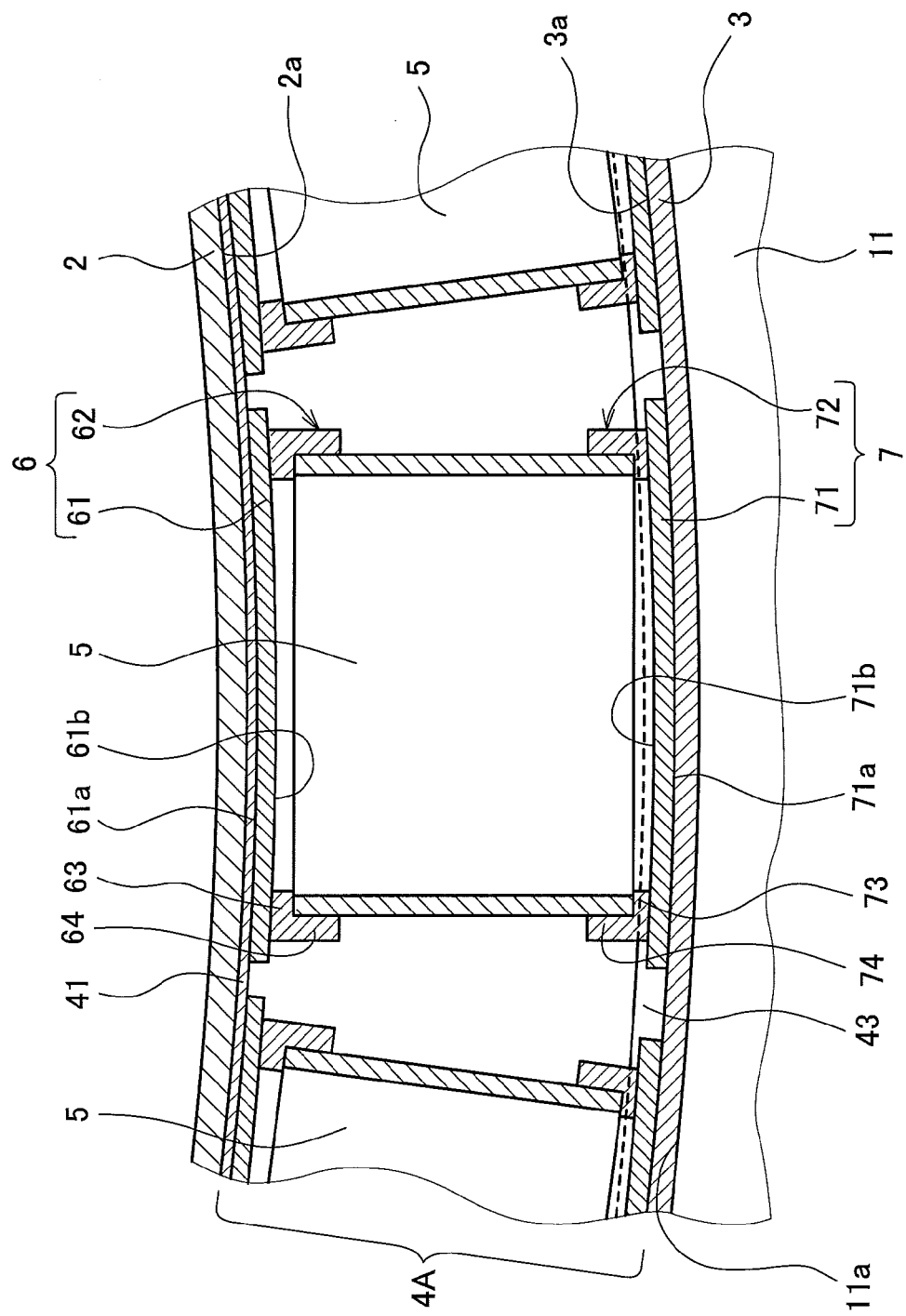
FIG. 5 is a front sectional view showing an essential part of a fixed-side first support unit.
Figure 6:
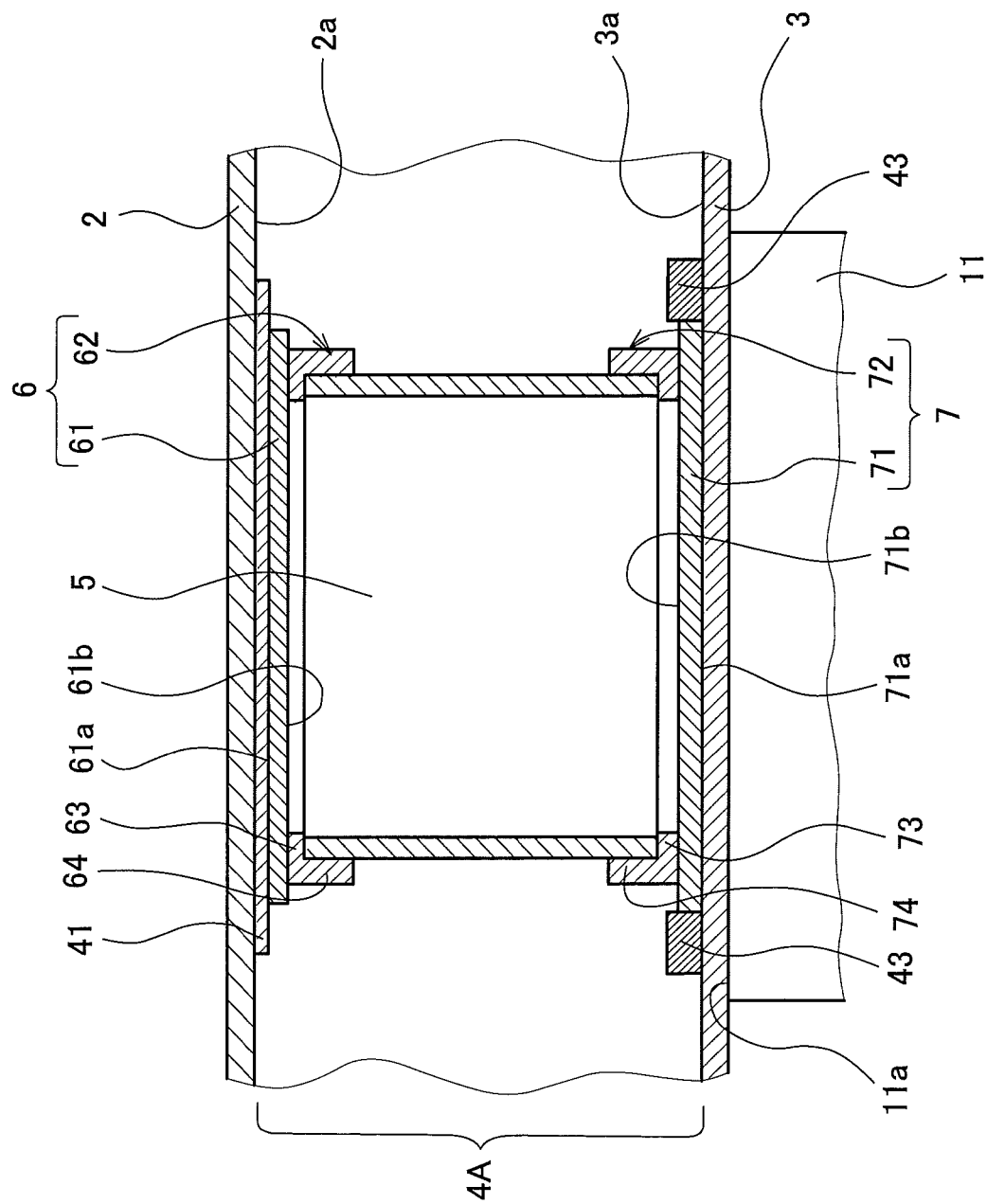
FIG. 6 is a side sectional view showing an essential part of the fixed-side first support unit.

As shown in FIG. 3 to FIG. 6, each of the first support unit 4A and the second support unit 4B includes: a plurality of cylindrical elements 5 arranged in the circumferential direction of the tank 8; a plurality of inner members 6 interposed between the inner shell 2 and the cylindrical elements 5; and a plurality of outer members 7 interposed between the outer shell 3 and the cylindrical elements 5. Each of the first support unit 4A and the second support unit 4B includes a belt-like reinforcing plate 41 joined to an outer peripheral surface 2a of the inner shell 2 and extending in the circumferential direction of the tank 8. Each support unit includes their unique component. As shown in FIG. 5 and FIG. 6, the first support unit 4A includes a pair of arc-shaped bars 43 fixed to an inner peripheral surface 3a of the outer shell 3 such that the arc-shaped bars 43 sandwich all of the outer members 7, whereas as shown in FIG. 3 and FIG. 4, the second support unit 4B includes an arc-shaped lubricating liner 42 sandwiched between the inner peripheral surface 3a of the outer shell 3 and all of the outer members 7.

The cylindrical elements 5 are disposed such that the axial direction of each cylindrical element 5 coincides with the radial direction of the tank 8. It should be noted that it is not essential that all of the cylindrical elements 5 be arranged on a single straight line extending in the circumferential direction of the tank 8. The cylindrical elements 5 may be arranged zigzag. In the present embodiment, the cross-sectional shape of each cylindrical element 5 is a circular shape. However, as an alternative, the cross-sectional shape of each cylindrical element 5 may be a polygonal shape.

Each cylindrical element 5 is made of glass fiber reinforced plastic (GFRP). In the case of a vacuum double-shell structure as in the present embodiment, it is desirable to perform plating treatment on each cylindrical element 5, such that a metal plating layer (not shown) is formed on each of the inner peripheral surface and the outer peripheral surface of each cylindrical element 5. The plating layer serves to prevent release of outgas from the GFRP cylindrical element 5 facing the vacuum space.

It should be noted that, both inside and outside the cylindrical elements 5, the outer peripheral surface 2a of the inner shell 2 may be covered with a thermal-insulating material (not shown) directly or via the reinforcing plate 41 and the inner members 6. The outer peripheral surface and the inner peripheral surface of the cylindrical elements 5 may also be covered with a thermal-insulating material.

On the outer peripheral surface 2a of the inner shell 2, each inner member 6 holds an end portion of a corresponding one of the cylindrical elements 5 at the inner shell 2 side. The inner members 6 are fixed by welding or the like to the outer peripheral surface 2a of the inner shell 2 via the reinforcing plate 41. In addition, for example, a member protruding from the reinforcing plate 41 may be provided around each inner member 6, and the inner member 6 may be fixed to the protruding member by fastening or the like.

In order to hold the cylindrical elements 5 with the inner members 6, the cylindrical elements 5 may be adhered to the inner members 6 by using an adhesive. However, in this case, there is a risk of release of outgas from the adhesive since the environment surrounding the adhesive is a vacuum environment. In the present embodiment, a fitting structure is adopted to prevent the risk.

Specifically, each inner member 6 includes: an inner surface plate 61 covering an opening of the corresponding cylindrical element 5 at the inner shell 2 side; and an inner fitting portion 62 protruding from the inner surface plate 61 and fitted to the end portion of the cylindrical element 5 at the inner shell 2 side. The inner fitting portion 62 is a different component from the inner surface plate 61, and is fixed to the inner surface plate 61 by welding or the like. However, as an alternative, the inner fitting portion 62 may be integrally formed on the inner surface plate 61. It is not essential for the inner surface plate 61 to entirely cover the opening of the cylindrical element 5 at the inner shell 2 side, and a large hole may be formed in the center of the inner surface plate 61. As another alternative, the inner surface plate 61 may be eliminated and the inner member 6 may only include the inner fitting portion 62. It should be noted that the cylindrical element 5 may be coupled to the inner fitting portion 62 by pins or the like from the viewpoint of work efficiency.

The inner surface plate 61 extends along the outer peripheral surface 2a of the inner shell 2 while keeping its constant thickness. A first main surface 61a of the inner surface plate 61 at the inner shell 2 side and a second main surface 61b of the inner surface plate 61 at the cylindrical element 5 side are both curved surfaces whose curvature center is the same as that of the outer peripheral surface 2a of the inner shell 2.

The inner fitting portion 62 has an annular shape such that the end portion of the cylindrical element 5 at the inner shell 2 side is fitted inside the inner fitting portion 62. Specifically, the inner fitting portion 62 has an L-shaped cross section, and includes: a peripheral wall 64 overlapping the outer peripheral surface of the cylindrical element 5; and a ring portion 63 protruding radially inward from an end portion of the peripheral wall 64 at the inner shell 2 side and being in contact with an end surface of the cylindrical element 5.

In the present embodiment, the internal diameter of the peripheral wall 64 at normal temperatures is substantially equal to the external diameter of the cylindrical element 5. When the low-temperature liquefied gas 9 is fed into the inner shell 2, thermal contraction of the inner shell 2 occurs. Since the temperature of the inner member 6 fixed to the inner shell 2 also becomes low, thermal contraction of the inner member 6 occurs. If the inner fitting portion 62 is fitted to the cylindrical element 5 from the outside, then formation of a gap between the inner fitting portion 62 and the cylindrical element 5 can be prevented when thermal contraction of the inner member 6 occurs.

The ring portion 63 serves to fill the gap between the second main surface 61b, which is a curved surface of the inner surface plate 61, and the flat end surface of the cylindrical element 5. Specifically, the thickness of the ring portion 63 gradually increases in the circumferential direction of the tank 8 in accordance with an increase in the distance from the central axis of the cylindrical element 5. However, as an alternative, the inner fitting portion 62 may only include the peripheral wall 64. In this case, the end surface of the cylindrical element 5 may be formed as a curved surface. However, since forming the end surface of the cylindrical element 5, which is made of GFRP, as a curved surface is not easy, it is desirable for the inner fitting portion 62 to include the ring portion 63.

It should be noted that it is not essential for the inner members 6 to be separate from one another in the circumferential direction of the tank 8, and all the inner members 6 may be connected to one another. For example, the inner surface plates 61 of all the inner members 6 may form a single continuous plate. In this case, the reinforcing plate 41 can be eliminated.

On the inner peripheral surface 3a of the outer shell 3, each outer member 7 holds an end portion of a corresponding one of the cylindrical elements 5 at the outer shell 3 side. As shown in FIG. 6, in the fixed-side first support unit 4A, the aforementioned pair of bars 43 forms a groove on the inner peripheral surface 3a of the outer shell 3, such that the groove extends in the circumferential direction of the tank 8. The outer members 7 of the first support unit 4A are fitted in the groove and are in direct contact with the inner peripheral surface 3a of the outer shell 3. In this manner, displacement of the outer members 7 of the first support unit 4A in the axial direction of the tank 8 relative to the inner peripheral surface 3a of the outer shell 3 is restricted. It should be noted that, instead of the bars 43, blocks that restrict the displacement of the outer members 7 in the axial direction of the tank 8 may be disposed for each outer member 7.

On the other hand, as shown in FIG. 4, in the sliding-side second support unit 4B, each outer member 7 is in contact with the inner peripheral surface 3a of the outer shell 3 via the aforementioned lubricating liner 42. The lubricating liner 42 is made of a favorably slidable material (e.g., fluorine resin or molybdenum disulfide). In the axial direction of the tank 8, the width of the lubricating liner 42 is greater than the width of each outer member 7, and the lubricating liner 42 protrudes beyond both sides of each outer member 7. Accordingly, the outer members 7 of the second support unit 4B are slidable on the inner peripheral surface 3a of the outer shell 3 in the axial direction of the tank 8.

As shown in FIG. 3 and FIG. 5, in both the first support unit 4A and the second support unit 4B, a gap is formed between each pair of adjoining outer members 7. The gap allows each outer member 7 to move in the circumferential direction of the tank 8 when a reduction in the diameter of the inner shell 2 occurs due to thermal contraction. In the above-described first support unit 4A, no lubricating liner 42 is sandwiched between the inner peripheral surface 3a of the outer shell 3 and the outer members 7 unlike the second support unit 4B. However, as an alternative, in the first support unit 4A, the lubricating liner 42 may be sandwiched between the inner peripheral surface 3a of the outer shell 3 and the outer members 7 in a manner similar to the second support unit 4B.

Similar to the inner members 6, the outer members 7 also adopt a fitting structure from the viewpoint of avoiding the use of an adhesive. Specifically, each outer member 7 includes: an outer surface plate 71 covering an opening of the corresponding cylindrical element 5 at the outer shell 3 side; and an outer fitting portion 72 protruding from the outer surface plate 71 and fitted to the end portion of the cylindrical element 5 at the outer shell 3 side. The outer fitting portion 72 is a different component from the outer surface plate 71, and is fixed to the outer surface plate 71 by welding or the like. However, as an alternative, the outer fitting portion 72 may be integrally formed on the outer surface plate 71. It is not essential for the outer surface plate 71 to entirely cover the opening of the cylindrical element 5 at the outer shell 3 side, and a large hole may be formed in the center of the outer surface plate 71. As another alternative, the outer surface plate 71 may be eliminated and the outer member 7 may only include the outer fitting portion 72. It should be noted that the cylindrical element 5 may be coupled to the outer fitting portion 72 by pins or the like from the viewpoint of work efficiency.

The outer surface plate 71 extends along the inner peripheral surface 3a of the outer shell 3 while keeping its constant thickness. A first main surface 71a of the outer surface plate 71 at the outer shell 3 side and a second main surface 71b of the outer surface plate 71 at the cylindrical element 5 side are both curved surfaces whose curvature center is the same as that of the inner peripheral surface 3a of the outer shell 3.

In the present embodiment, the outer fitting portion 72 has an annular shape such that the end portion of the cylindrical element 5 at the outer shell 3 side is fitted inside the outer fitting portion 72. However, unlike the inner members 6, a decrease in the temperature of the outer members 7 when the low-temperature liquefied gas 9 is fed into the inner shell 2 is small since the temperature of the outer shell 3 stays within a normal temperature range even when the low-temperature liquefied gas 9 is fed into the inner shell 2. Therefore, the outer fitting portion 72 may be fitted to the cylindrical element 5 from the outside as in the present embodiment, or conversely, fitted to the cylindrical element 5 from the inside.

Specifically, the outer fitting portion 72 has an L-shaped cross section, and includes: a peripheral wall 74 overlapping the outer peripheral surface of the cylindrical element 5; and a ring portion 73 protruding radially inward from an end portion of the peripheral wall 74 at the outer shell 3 side and being in contact with an end surface of the cylindrical element 5.

The ring portion 73 serves to fill the gap between the second main surface 71b, which is a curved surface of the outer surface plate 71, and the flat end surface of the cylindrical element 5. Specifically, the thickness of the ring portion 73 gradually decreases in the circumferential direction of the tank 8 in accordance with an increase in the distance from the central axis of the cylindrical element 5. However, as an alternative, the outer fitting portion 72 may only include the peripheral wall 74. In this case, the end surface of the cylindrical element 5 may be formed as a curved surface. However, since forming the end surface of the cylindrical element 5, which is made of GFRP, as a curved surface is not easy, it is desirable for the outer fitting portion 72 to include the ring portion 73.

As described above, in the double-shell tank structure according to the present embodiment, the cylindrical elements 5 arranged in the circumferential direction of the tank 8 and the inner and outer members 6 and 7 sandwiching the cylindrical elements 5 form a hollow load-transmitting structure extending in the circumferential direction of the tank 8. Since the axial direction of each cylindrical element 5 coincides with the radial direction of the tank 8, the load of the inner shell 2 including the contents therein is dispersed as compressive force in the axial direction of each cylindrical element 5 regardless of the orientation of the ship. Therefore, each of the first support unit 4A and the second support unit 4B can bear the load of the inner shell 2 even when the ship oscillates. In addition, since GFRP whose thermal conductivity is low is used as the material forming each cylindrical element 5, the entry of heat via the support units 4A and 4B can be further suppressed.

The inner members 6 are fixed to the inner shell 2, and displacement of the outer members 7 of the first support unit 4A in the axial direction of the tank 8 is restricted while the outer members 7 of the second support unit 4B are allowed to slide in the axial direction of the tank 8. This makes it possible to accommodate a reduction in the length of the inner shell 2 due to thermal contraction.

In both the first support unit 4A and the second support unit 4B, a gap is formed between each pair of adjoining outer members 7, the gap allowing each outer member 7 to move in the circumferential direction of the tank 8. This makes it possible to allow the outer members 7 to move together with the cylindrical elements 5 when a reduction in the diameter of the inner shell 2 occurs due to thermal contraction.

Further, in the present embodiment, since each outer member 7 includes the outer fitting portion 72, the end portion of each cylindrical element 5 at the outer shell 3 side can be held with a simple shape. Since each outer member 7 also includes the outer surface plate 71, the outer surface plate 71 is made in contact with the inner peripheral surface 3a of the outer shell 3 by a large area, and thereby contact pressure can be made small. This makes smooth sliding of the outer members 7 possible.

Similarly, since each inner member 6 includes the inner fitting portion 62, the end portion of each cylindrical element 5 at the inner shell 2 side can be held with a simple shape.

<Variation>

(1) Inner Member

It is not essential that the inner fitting portion 62 of the inner member 6 be fitted to the cylindrical element 5 from the outside, and the inner fitting portion 62 of the inner member 6 may be fitted to the cylindrical element 5 from the inside. For example, the inner fitting portion 62 may have a discoid shape fitted in the opening of the cylindrical element 5 at the inner shell 2 side. However, it is desirable that the inner fitting portion 62 be fitted to the cylindrical element 5 from the outside as described in the above embodiment from the viewpoint of preventing the formation of a gap between the inner fitting portion 62 and the cylindrical element 5 when the temperature of the inner member 6 becomes low.

As another variation, it is not essential for the inner member 6 to include the inner fitting portion 62. For example, a flange may be integrally formed on the cylindrical element 5, and the flange may be fastened to bolts protruding from the inner surface plate 61 by nuts. Alternatively, the cylindrical element 5 and the inner surface plate 61 may be fastened together by using L-shaped metal fittings.

Figure 7:
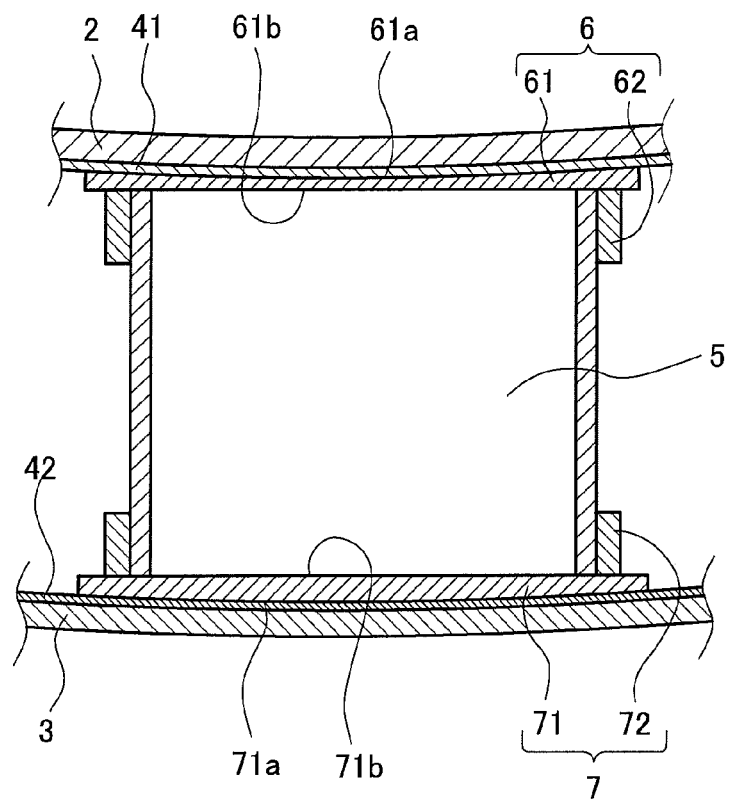
FIG. 7 is a front sectional view showing inner and outer members according to one variation.

It is not essential that the second main surface 61b of the inner surface plate 61 at the cylindrical element 5 side have a curved surface whose curvature center is the same as that of the outer peripheral surface 2a of the inner shell 2. As shown in FIG. 7, the second main surface 61b may be a flat surface perpendicular to the radial direction of the tank 8. According to this configuration, the shape of the inner member 6 can be made simpler.

Figure 8:
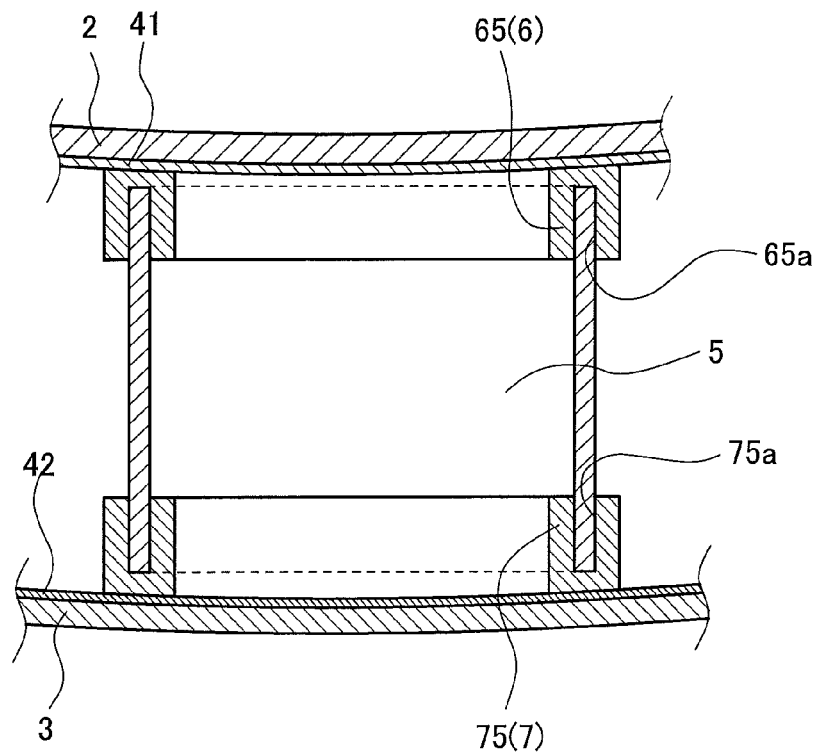
FIG. 8 is a front sectional view showing inner and outer members according to another variation.

Alternatively, as shown in FIG. 8, the inner member 6 may be an annular member 65, in which a groove 65a is formed. The end portion of the cylindrical element 5 at the inner shell 2 side is fitted in the groove 65a. According to this configuration, each inner member 6 can be formed as, for example, a single component, and thereby the number of components can be reduced.

(2) Outer Member

It is not essential for the outer members 7 to be separate from one another in the circumferential direction of the tank 8. All or some of the outer members 7 may be connected to one another. However, it is desirable that a gap be formed between each pair of adjoining outer members 7 of, at least, the sliding-side support unit 4B, such that each of these outer members 7 is movable not only in the axial direction of the tank 8 but also in the circumferential direction of the tank 8. This makes it possible to effectively utilize a configuration in which the outer members 7 are made slidable in the axial direction of the tank 8 (i.e., the configuration adopting the lubricating liner 42 in the above-described embodiment) while accommodating a reduction in the diameter of the inner shell 2.

It is not essential for the outer member 7 to include the outer fitting portion 72. For example, a flange may be integrally formed on the cylindrical element 5, and the flange may be fastened to bolts protruding from the outer surface plate 71 by nuts. Alternatively, the cylindrical element 5 and the outer surface plate 71 may be fastened together by using L-shaped metal fittings.

It is not essential that the second main surface 71b of the outer surface plate 71 at the cylindrical element 5 side have a curved surface whose curvature center is the same as that of the inner peripheral surface 3a of the outer shell 3. As shown in FIG. 7, the second main surface 71b may be a flat surface perpendicular to the radial direction of the tank 8. According to this configuration, the shape of the outer member 7 can be made simpler.

Alternatively, as shown in FIG. 8, the outer member 7 may be an annular member 75, in which a groove 75a is formed. The end portion of the cylindrical element 5 at the outer shell 3 side is fitted in the groove 75a. According to this configuration, each outer member 7 can be formed as, for example, a single component, and thereby the number of components can be reduced.

In the sliding-side second support unit 4B, it is not essential that the lubricating liner 42 be sandwiched between the inner peripheral surface 3a of the outer shell 3 and the outer members 7. For example, the outer surface plate 71 of each outer member 7 can be made of a resin with favorable sliding ability. Alternatively, in a case where the outer surface plate 71 of each outer member 7 is made of a metal, a lubricating oil may be applied onto the inner peripheral surface 3a of the outer shell 3, which is contacted by the outer surface plate 71.

However, if the lubricating liner 42 is sandwiched between the inner peripheral surface 3a of the outer shell 3 and the outer members 7 of the second support unit 4B as in the above-described embodiment, friction between the inner peripheral surface 3a of the outer shell 3 and the outer members 7 can be reduced with a simple configuration. This makes it possible to prevent excessive shear force from being exerted on the cylindrical elements 5.

INDUSTRIAL APPLICABILITY

The double-shell ship tank structure according to the present invention is particularly useful when applied to a liquefied gas carrier for marine transportation of a low-temperature liquefied gas.

REFERENCE SIGNS LIST 1 liquefied gas carrier
2 inner shell
2a outer peripheral surface
3 outer shell
3a inner peripheral surface
4A first support unit
4B second support unit
42 lubricating liner
5 cylindrical element
6 inner member
61 inner surface plate
61a first main surface
61b second main surface
62 inner fitting portion
65 annular member
65a groove
7 outer member
71 outer surface plate
71a first main surface
71b second main surface
72 outer fitting portion
75 annular member
75a groove
8 double-shell tank

The invention claimed is:

1. A double-shell ship tank structure, which is a structure of a horizontal type cylindrical double-shell tank mounted on a ship, the structure comprising:
an inner shell storing a liquefied gas;
an outer shell forming a vacuum space between the inner shell and the outer shell; and
a pair of support units disposed between the inner shell and the outer shell and supporting the inner shell from below with respect to the direction of gravity at positions spaced apart from each other in an axial direction of the tank, wherein each of the pair of support units includes:
a plurality of cylindrical elements arranged in a circumferential direction of the tank such that an axial direction of each of the cylindrical elements coincides with a radial direction of the tank;
a plurality of inner members each holding, on an outer peripheral surface of the inner shell, an end portion of a corresponding one of the cylindrical elements at the inner shell side; and
a plurality of outer members each holding, on an inner peripheral surface of the outer shell, an end portion of a corresponding one of the cylindrical elements at the outer shell side,
each of the cylindrical elements is made of glass fiber reinforced plastic, and
at least one of the cylindrical elements is arranged such that a distance between the at least one cylindrical element and at least one of two directly adjacent cylindrical elements on either side of the at least one cylindrical element in the circumferential direction is less than the width of the at least one cylindrical element, or a distance between the inner shell and the outer shell.

2. A double-shell ship tank structure, which is a structure of a horizontal type cylindrical double-shell tank mounted on a ship, the structure comprising:
an inner shell storing a liquefied gas;
an outer shell forming a vacuum space between the inner shell and the outer shell; and
a pair of support units disposed between the inner shell and the outer shell and supporting the inner shell at positions spaced apart from each other in an axial direction of the tank, wherein
each of the pair of support units includes:
a plurality of cylindrical elements arranged in a circumferential direction of the tank such that an axial direction of each of the cylindrical elements coincides with a radial direction of the tank;
a plurality of inner members each holding, on an outer peripheral surface of the inner shell, an end portion of a corresponding one of the cylindrical elements at the inner shell side; and
a plurality of outer members each holding, on an inner peripheral surface of the outer shell, an end portion of a corresponding one of the cylindrical elements at the outer shell side,
each of the cylindrical elements is made of glass fiber reinforced plastic, and
a metal plating layer is formed on each of an inner peripheral surface and an outer peripheral surface of each of the cylindrical elements.

3. The double-shell ship tank structure according claim 1, wherein
each of the inner members includes an inner fitting portion fitted to the end portion of the corresponding cylindrical element at the inner shell side.

4. The double-shell ship tank structure according to claim 3, wherein
the inner fitting portion has an annular shape such that the end portion of the cylindrical element at the inner shell side is fitted inside the inner fitting portion.

5. The double-shell ship tank structure according to claim 3, wherein
each of the inner members includes an inner surface plate covering an opening of the corresponding cylindrical element at the inner shell side, and the inner fitting portion protrudes from the inner surface plate.

6. The double-shell ship tank structure according to claim 5, wherein
a first main surface of the inner surface plate at the inner shell side is a curved surface whose curvature center is the same as that of the outer peripheral surface of the inner shell, and
a second main surface of the inner surface plate at the cylindrical element side is a flat surface perpendicular to the radial direction of the tank.

7. The double-shell ship tank structure according to claim 1, wherein
each of the inner members is an annular member with a groove formed therein, and the end portion of the corresponding cylindrical element at the inner shell side is fitted in the groove.

8. The double-shell ship tank structure according to claim 1, wherein
each of the outer members includes an outer fitting portion fitted to the end portion of the corresponding cylindrical element at the outer shell side.

9. The double-shell ship tank structure according to claim 8, wherein
each of the outer members includes an outer surface plate covering an opening of the corresponding cylindrical element at the outer shell side, and
the outer fitting portion protrudes from the outer surface plate.

10. The double-shell ship tank structure according to claim 9, wherein
a first main surface of the outer surface plate at the outer shell side is a curved surface whose curvature center is the same as that of the inner peripheral surface of the outer shell, and
a second main surface of the inner surface plate at the cylindrical element side is a flat surface perpendicular to the radial direction of the tank.

11. The double-shell ship tank structure according to claim 1, wherein
each of the outer members is an annular member with a groove formed therein, and the end portion of the corresponding cylindrical element at the outer shell side is fitted in the groove.

12. A double-shell ship tank structure, which is a structure of a horizontal type cylindrical double-shell tank mounted on a ship, the structure comprising:
an inner shell storing a liquefied gas;
an outer shell forming a vacuum space between the inner shell and the outer shell; and
a pair of support units disposed between the inner shell and the outer shell and supporting the inner shell at positions spaced apart from each other in an axial direction of the tank, wherein
each of the pair of support units includes:
a plurality of cylindrical elements arranged in a circumferential direction of the tank such that an axial direction of each of the cylindrical elements coincides with a radial direction of the tank;
a plurality of inner members each holding, on an outer peripheral surface of the inner shell, an end portion of a corresponding one of the cylindrical elements at the inner shell side; and
a plurality of outer members each holding, on an inner peripheral surface of the outer shell, an end portion of a corresponding one of the cylindrical elements at the outer shell side,
each of the cylindrical elements is made of glass fiber reinforced plastic,
the inner members are fixed to the inner shell,
the outer members of one of the pair of support units are configured such that displacement of the outer members in the axial direction of the tank relative to the outer shell is restricted, and
the outer members of the other one of the pair of support units are configured to be slidable on the inner peripheral surface of the outer shell in the axial direction of the tank.

13. The double-shell ship tank structure according to claim 12, wherein
a gap is formed between each pair of adjoining outer members among the outer members of each of the pair of support units, the gap allowing each outer member to move in the circumferential direction of the tank.

14. The double-shell ship tank structure according to claim 12, wherein
a lubricating liner is sandwiched between the inner peripheral surface of the outer shell and the outer members of the other one of the pair of support units.

15. A liquefied gas carrier comprising:
a horizontal type cylindrical double-shell tank with the double-shell ship tank structure according to claim 1; and
a pair of saddles supporting the tank at positions corresponding to the pair of support units.

16. The double-shell ship tank structure according to claim 1, wherein
at least one of the cylindrical elements is arranged such that a distance between the at least one cylindrical element and each of two directly adjacent cylindrical elements on either side of the at least one cylindrical element in the circumferential direction is less than the width of the at least one cylindrical element.

* * * * *